(12) United States Patent
Joung et al.

(10) Patent No.: US 9,885,445 B2
(45) Date of Patent: Feb. 6, 2018

(54) LOCKING-UNLOCKING STRUCTURE FOR GUIDING FORWARD LIFTING OF LIFTING BODY BY REPEATING PUSHING ACTION

(71) Applicants: WhiDong Joung, Hwaseong-si, Gyeonggi-do (KR); MICROFILTER Co., Ltd, Chungcheongbuk-do (KR)

(72) Inventors: WhiDong Joung, Hwaseong-si (KR); Jaelk Lee, Cheongju-si (KR); PilKang Hwang, Jincheon-gun (KR)

(73) Assignee: MICROFILTER Co., Ltd., Jincheon-gun (KR)

( * ) Notice: Subject to any disclaimer, the term of this patent is extended or adjusted under 35 U.S.C. 154(b) by 48 days.

(21) Appl. No.: 15/072,040

(22) Filed: Mar. 16, 2016

(65) Prior Publication Data

US 2016/0271537 A1    Sep. 22, 2016

(30) Foreign Application Priority Data

Mar. 16, 2015   (KR) .......................... 10-2015-0036200

(51) Int. Cl.
| | |
|---|---|
| *B01D 35/30* | (2006.01) |
| *F16M 13/00* | (2006.01) |
| *B01D 27/00* | (2006.01) |

(52) U.S. Cl.
CPC ............. *F16M 13/00* (2013.01); *B01D 35/30* (2013.01); *B01D 2201/302* (2013.01);
(Continued)

(58) Field of Classification Search
CPC ...... B01D 35/30; B01D 35/306; B01D 35/00; B01D 2201/4007; B01D 2201/302;
(Continued)

(56) References Cited

U.S. PATENT DOCUMENTS 6,148,692 A * 11/2000 Russell .................. B67B 7/182
                                                            81/3.2
8,097,156 B2 * 1/2012 Tubby .................... B01D 29/96
                                                            210/232
(Continued)

FOREIGN PATENT DOCUMENTS

KR        10-1570193 B1    11/2015

*Primary Examiner* — Tan Le
(74) *Attorney, Agent, or Firm* — Jefferson IP Law, LLP (57) ABSTRACT

A locking-unlocking structure for guiding forward lifting of a lifting body lifted by repeating a pushing action is provided. The locking-unlocking structure includes an actuation guide unit provided at a center thereof therein with a stop groove to guide stop of a lifting body in a lifting state, having a lifting line and a falling line branching downward from the stop groove, and fixedly coupled to a fixing body, and an actuation unit comprising a lifting plate having a stop protrusion, which is mounted in the stop groove of the actuation guide unit or circulates along the lifting line and the falling line, and coupled to the lifting body movably left and right. The guide protrusion protrudes from the falling line of the actuation guide unit while being inclined downward along the falling line to block an entrance so that the stop protrusion of the lifting plate is prevented from entering the falling line when the lifting plate of the actuation unit is lifted. The guide protrusion is provided in an elastic member to be elastically actuated when the stop protrusion of the lifting plate falls along the falling line.

6 Claims, 11 Drawing Sheets

(52) U.S. Cl.
CPC ...... *B01D 2201/4007* (2013.01); *C02F 2201/004* (2013.01); *C02F 2201/006* (2013.01); *F16M 2200/028* (2013.01)

(58) Field of Classification Search
CPC .............. F16M 13/00; F16M 2200/028; C02F 2201/004; C02F 2201/006
USPC ........ 210/136, 153, 232, 234, 236; 248/651, 248/655, 658
See application file for complete search history.

(56) References Cited

U.S. PATENT DOCUMENTS

| | | | |
|---|---|---|---|
| 9,233,322 B1* | 1/2016 | Huda | B01D 29/96 |
| 2011/0139698 A1* | 6/2011 | Freystedt | B01D 35/147 |
| | | | 210/232 |
| 2011/0174705 A1* | 7/2011 | Branscomb | B01D 35/153 |
| | | | 210/153 |
| 2016/0271536 A1* | 9/2016 | Joung | B01D 27/00 |
| 2016/0271538 A1* | 9/2016 | Joung | F16M 13/00 |

* cited by examiner

LOCKING-UNLOCKING STRUCTURE FOR GUIDING FORWARD LIFTING OF LIFTING BODY BY REPEATING PUSHING ACTION

CROSS REFERENCE TO RELATED APPLICATION(S)

This application claims the benefit under 35 U.S.C. § 119(a) of a Korean patent application filed on Mar. 16, 2015 in the Korean Intellectual Property Office and assigned Serial number 10-2015-0036200, the entire disclosure of which is hereby incorporated by reference.

BACKGROUND OF THE INVENTION

1. Field of the Invention

The present invention relates to a locking-unlocking structure capable of guiding only forward lifting in lifting to repeatedly perform the stopping (locking) of a lifting body in a lifting state and the falling (unlocking) of the lifting body in the stopping state in the case that a filter cartridge to be replaced or various articles (lifting body), which require lifting (including falling), are lifted by repeating a pushing action in a water purification system.

In addition, the completion state of the falling can be acoustically recognized in falling.

In addition, the above structure is possible through structure modification without use of additional components.

2. Description of the Related Art

Recently, applicant of the present invention has suggested a locking-unlocking structure including a lifting line to guide lifting and a falling line to guide falling to repeat the lifting and the falling through the circulation between the lifting line and the falling line in the case that a lifting body to be lifted through repeatedly pushing actions falls by releasing (unlocking) of the stopping state through a re-pushing action after stopping (locking) in a lifting state.

However, the structure includes an actuation unit coupled to the lifting body and provided in a plate shape and an actuation guide unit fixedly coupled to a fixing body. The actuation unit includes a lifting plate mounted in the lifting body to allow the circulation between the lifting line and the falling line.

In the case that a stop protrusion provided on a lifting plate circulates between the lifting line and the falling line branching into the left and right sides of the actuation guide unit provided in the plate space, when the stop protrusion of the lifting plate is lifted through the lifting line, the stop protrusion of the lifting plate may enter through the falling line, so that the lifting may not be exactly guided.

Further, in the case that the structure is mounted in a water purification system or a refrigerator, a user cannot visually recognize the completion of the falling in the falling of the lifting body, so the user may forcibly remove the filter cartridge out of a lifting body, which may cause the failure of the water purification system or the refrigerator.

SUMMARY OF THE INVENTION

The present invention is to guide a stop protrusion of a lifting plate so that the stop protrusion is lifted only along a lifting line, to allow a user to acoustically recognize the completion of falling of the stop protrusion, and allow the realization of the above structure without an additional part.

To this end, a structure of a locking-unlocking includes an actuation guide unit provided at a center thereof therein with a stop groove to guide stop of a lifting body in a lifting state, having a lifting line and a falling line branching downward from the stop groove, and provided in a plate shape, and an actuation unit including a lifting plate having a stop protrusion, which is mounted in the stop groove of the actuation guide unit or circulates along the lifting line and the falling line. The actuation unit is coupled the lifting body.

In this state, an elastic member is provided along the falling line of the actuation guide unit, and the elastic member is cut out except for only a portion at one side of the actuation guide unit.

In addition, the elastic member is provided at a front end thereof with a guide protrusion that is gradually raised up.

The guide protrusion protrudes to the extent of blocking the falling line so that the stop protrusion is lifted only along the lifting line when viewed from the lifting line.

The stop protrusion sliding along the guide protrusion is provided so that a contact surface formed in the lifting plate collides with the guide protrusion as a portion of the lifting plate is exposed.

As described above, the guide protrusion blocks the falling line to guide the stop protrusion so that the stop protrusion is lifted along only the lifting line when the stop protrusion is lifted, so that the operation can be correctly guided.

In addition, the elastic member having the guide protrusion can be realized through simply cutting because the actuation guide unit is provided in the plate shape.

In addition, when the guide protrusion formed on the elastic member is separated from the stop protrusion, the guide protrusion collides with the contact surface of the lifting plate having the stop protrusion to generate rhythmical sound, so that the completion of the falling is acoustically recognized.

DETAILED DESCRIPTION OF THE INVENTION

Hereinafter, the present invention will be described in detail with reference to accompanying drawings.

Figure 1:
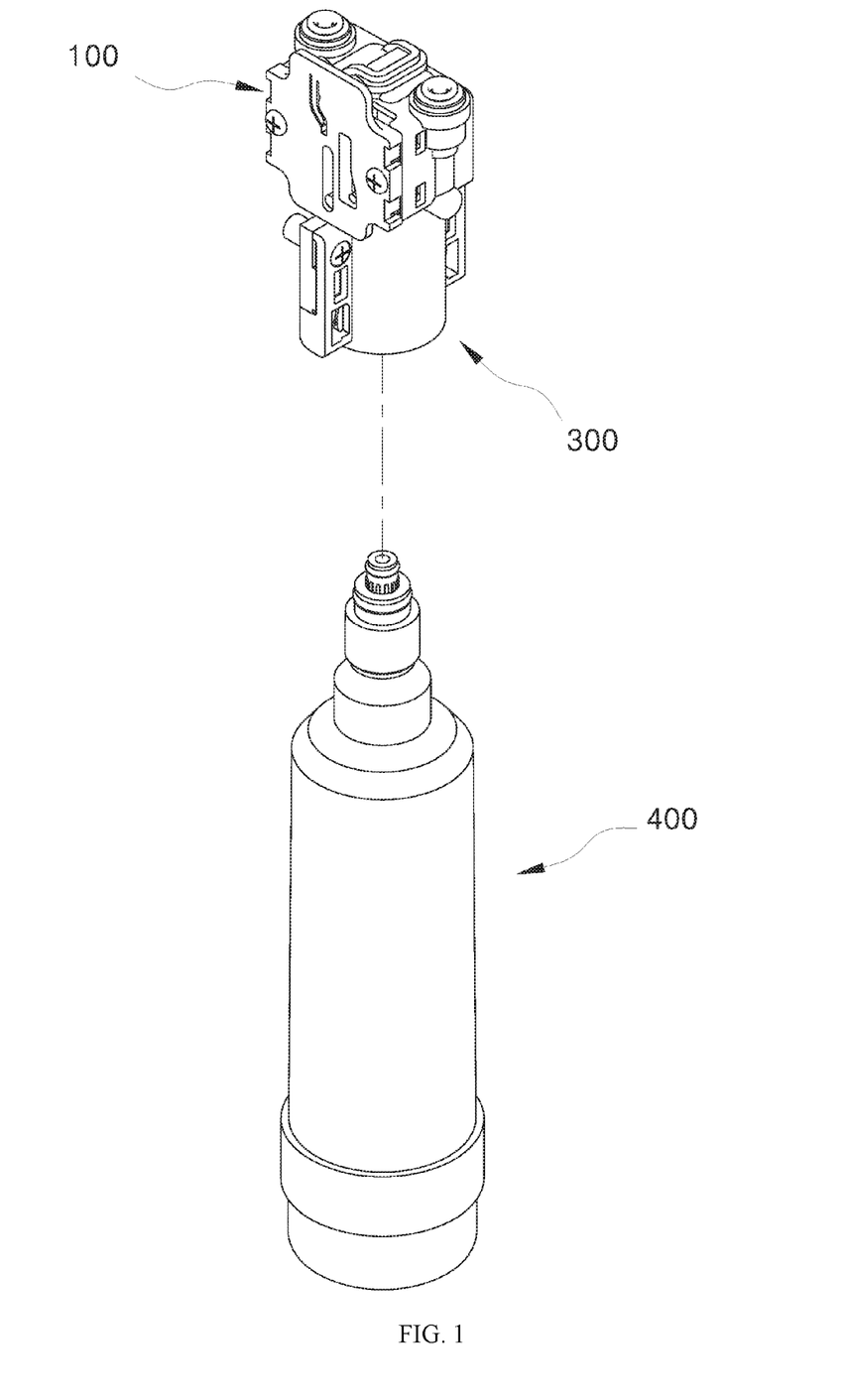
FIG. 1 is a perspective view showing a whole assembly structure according to one embodiment of the present invention.
Figure 2:
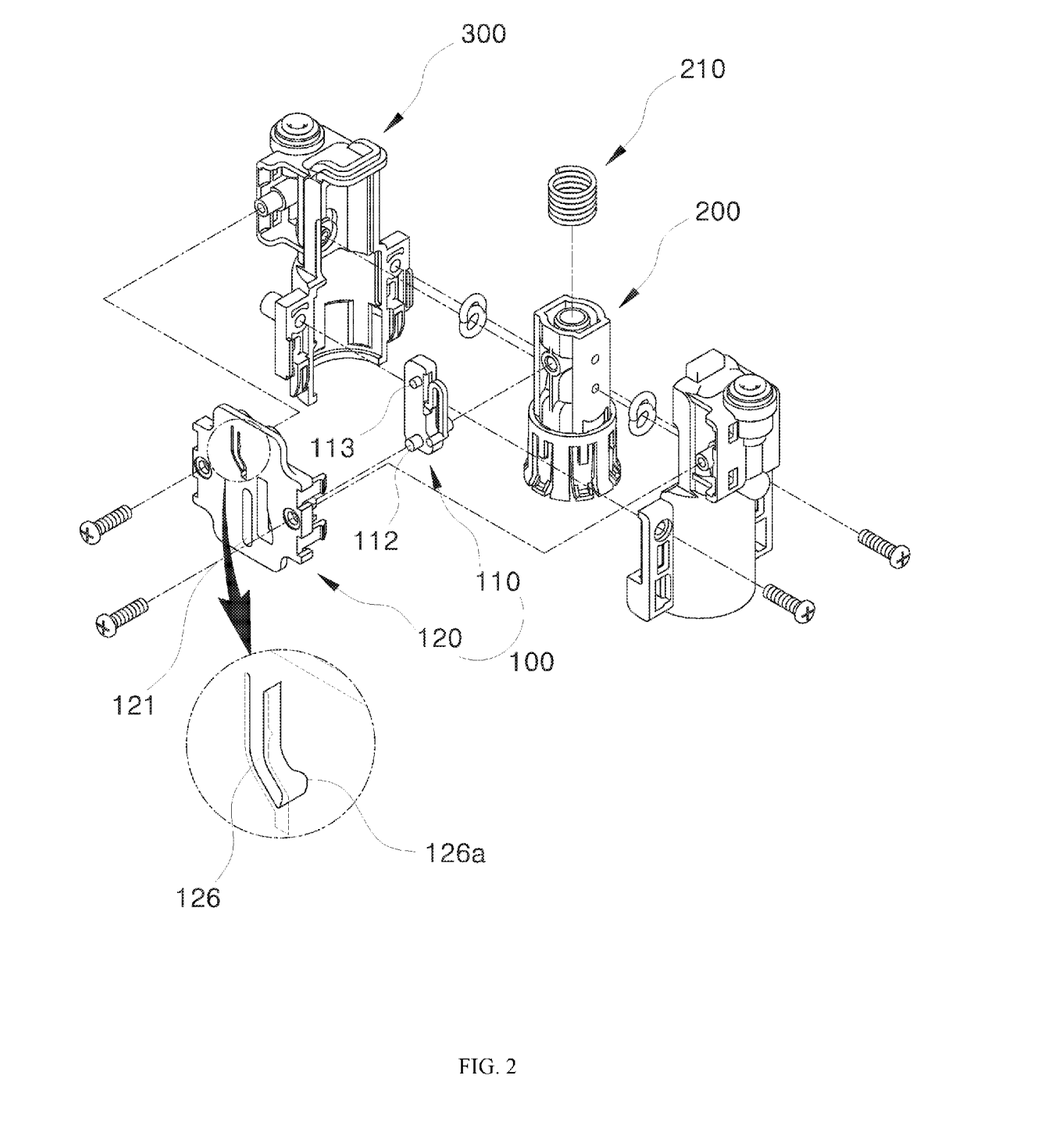
FIG. 2 is an exploded perspective view showing main components of an elastic member according to the present invention.
Figure 3:
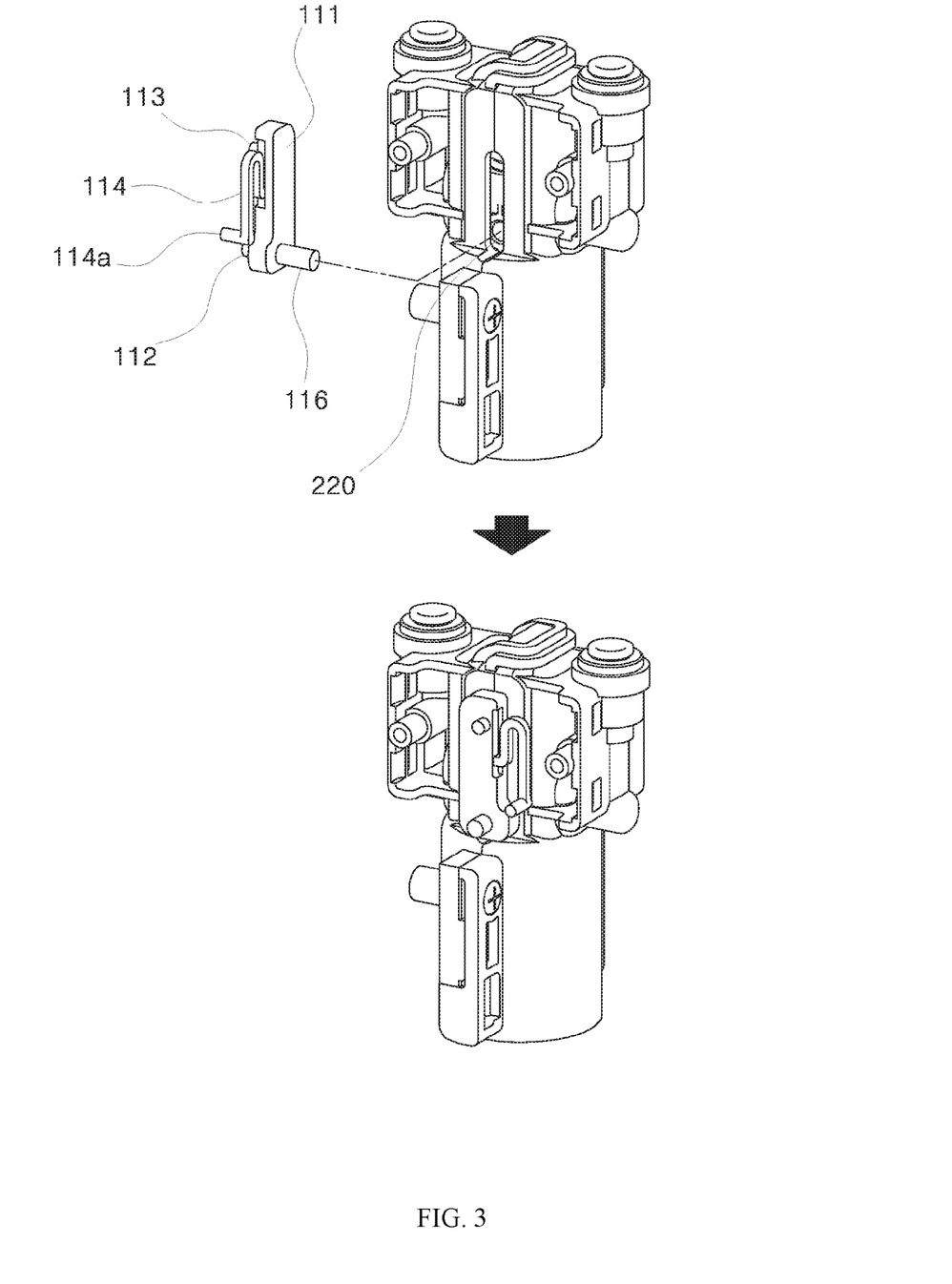
FIG. 3 is a view showing a lifting plate coupled to a lifting body according to one embodiment of the present invention.
Figure 4A:
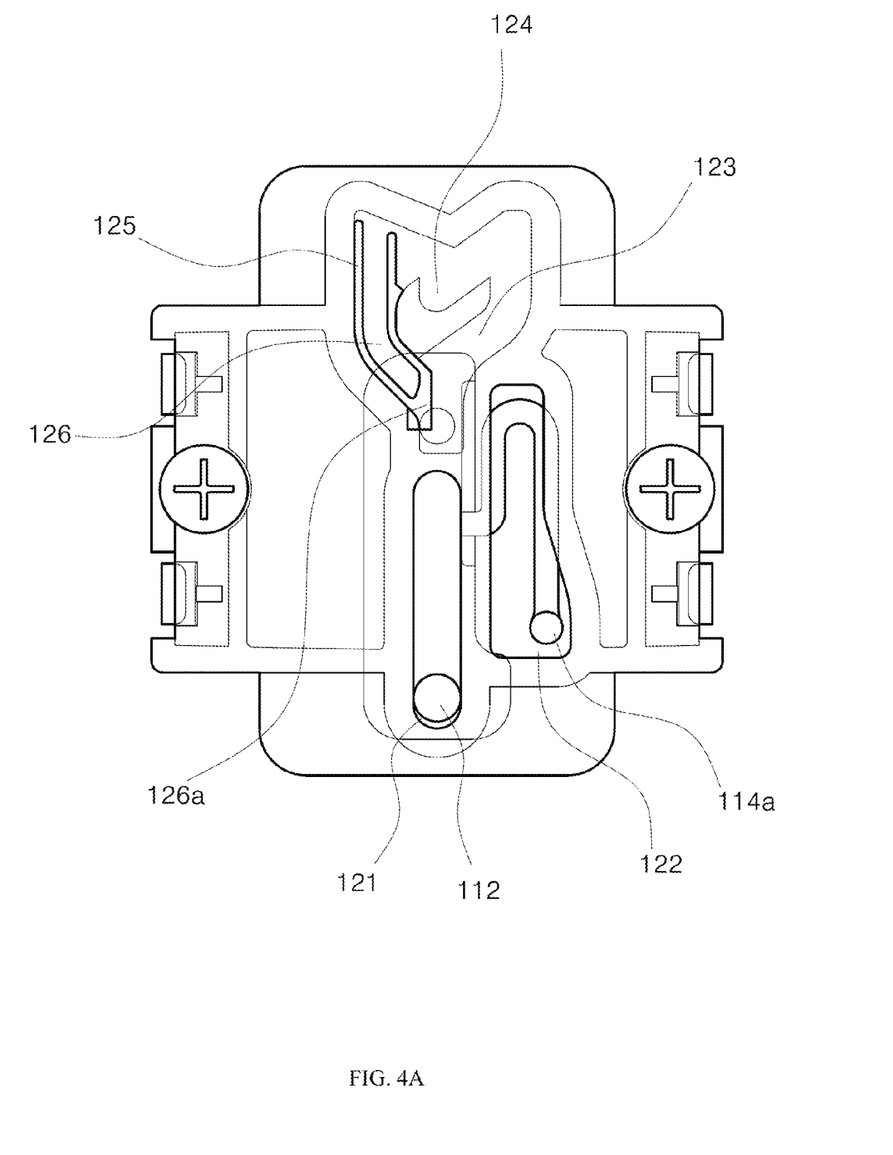
FIGS. 4A to 4G are views showing the circulation of a lifting plate between lifting and falling lines of an actuation unit according to the present invention.
Figure 4B:
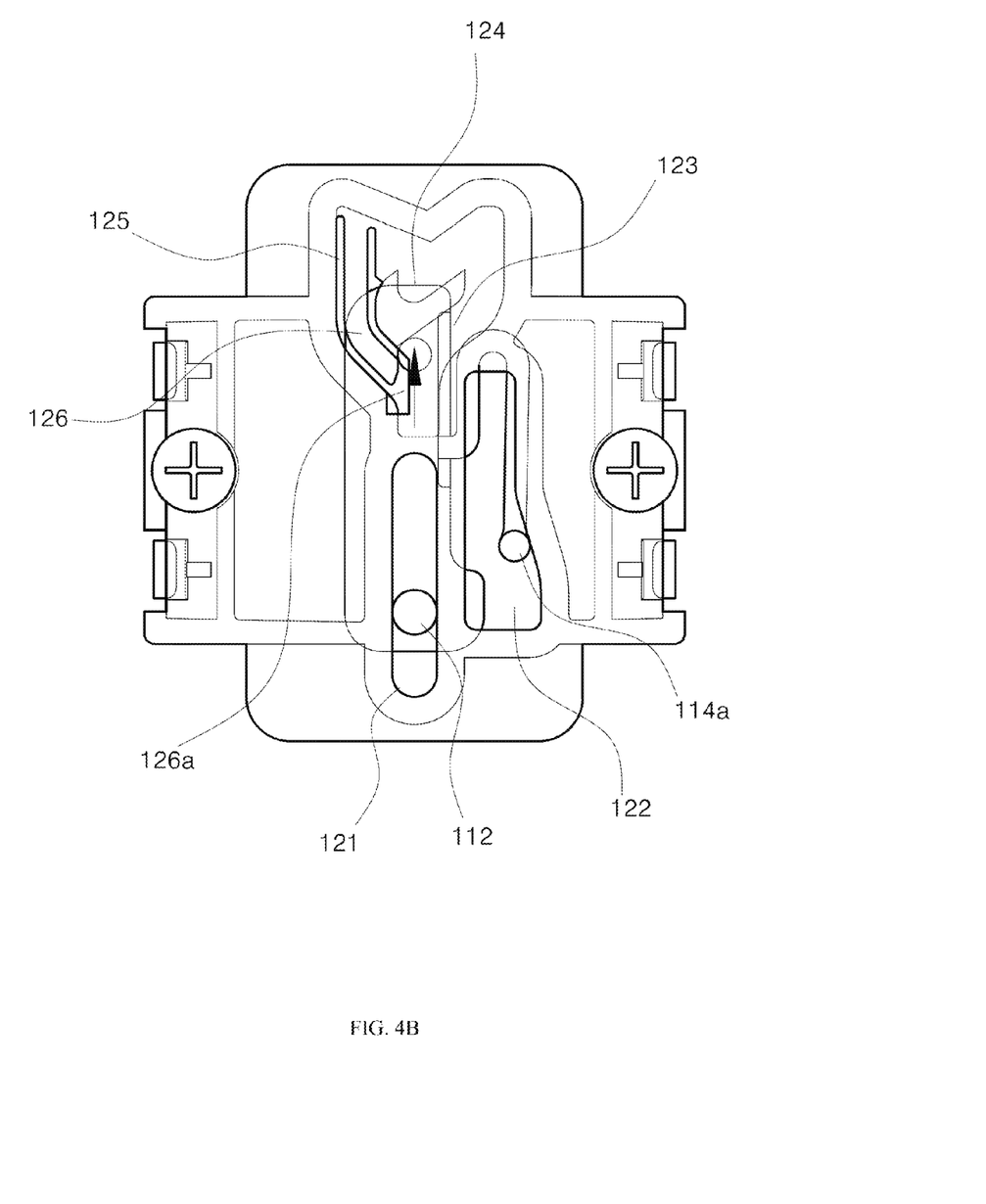
Figure 4C:
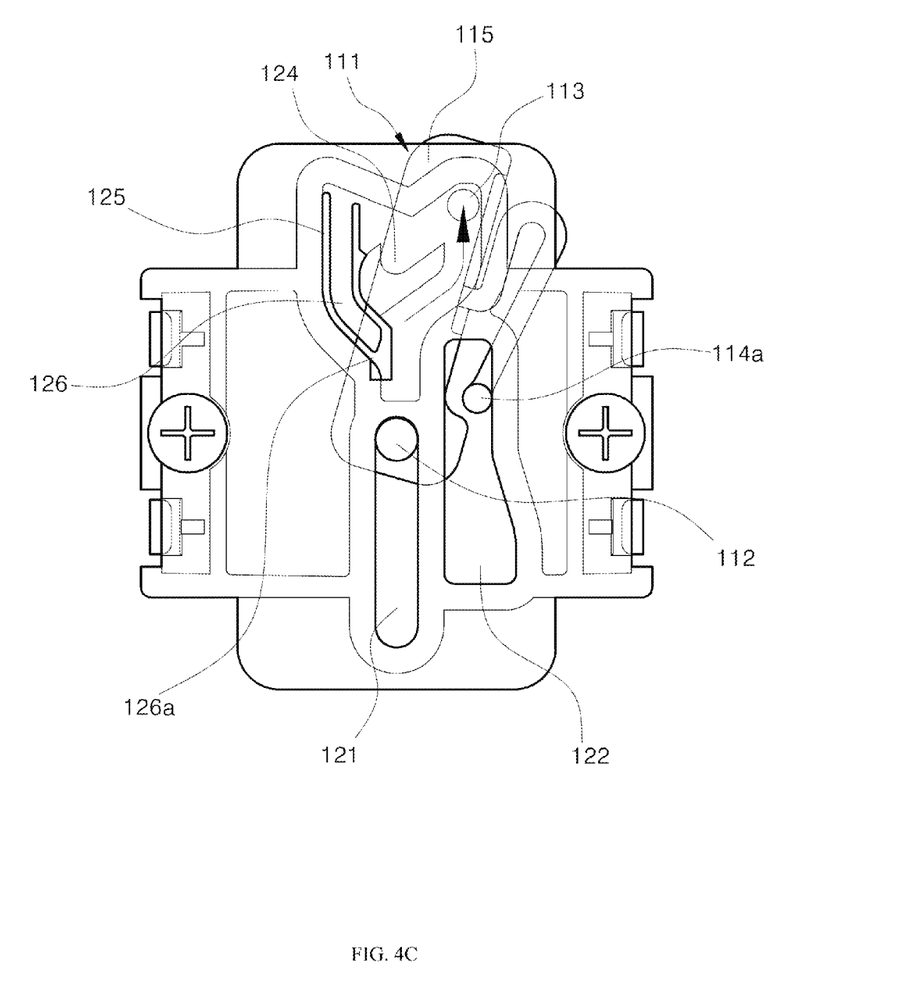
Figure 4D:
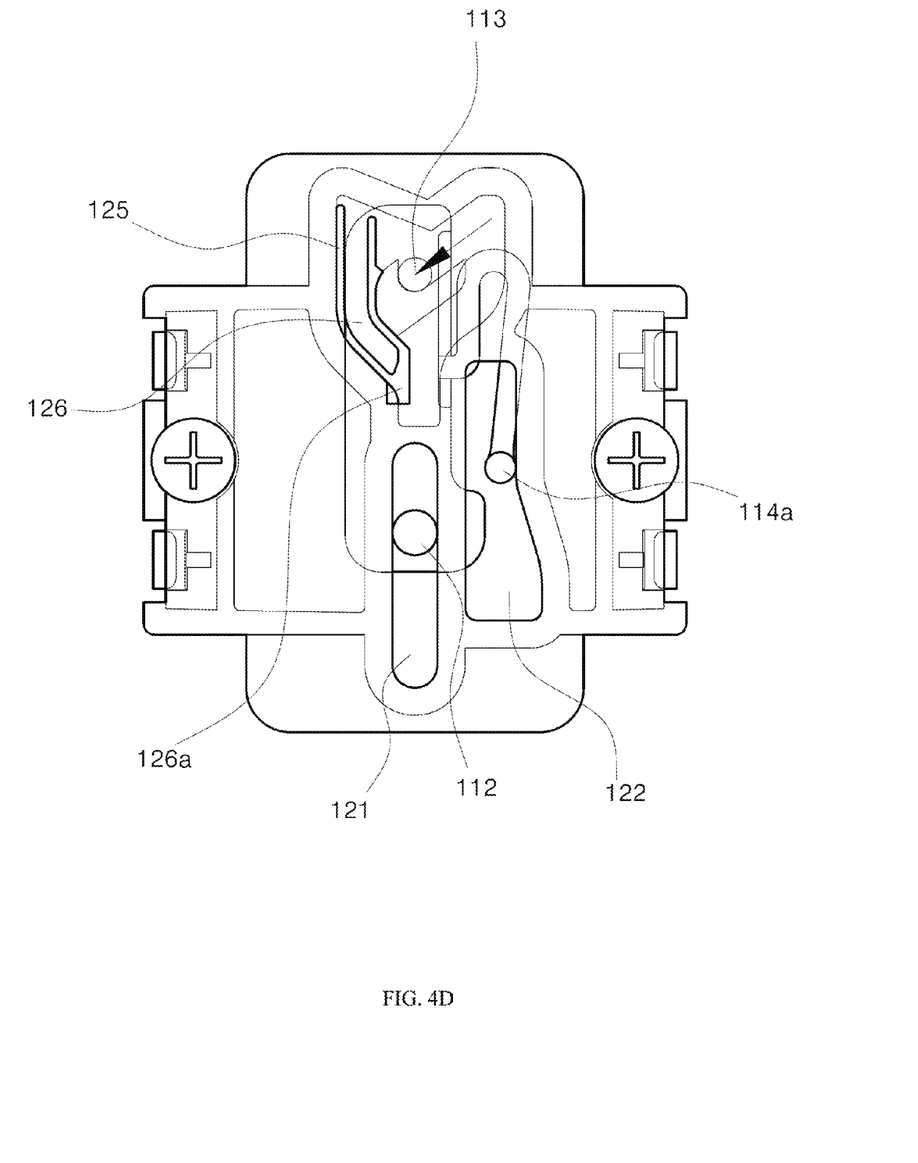
Figure 4E:
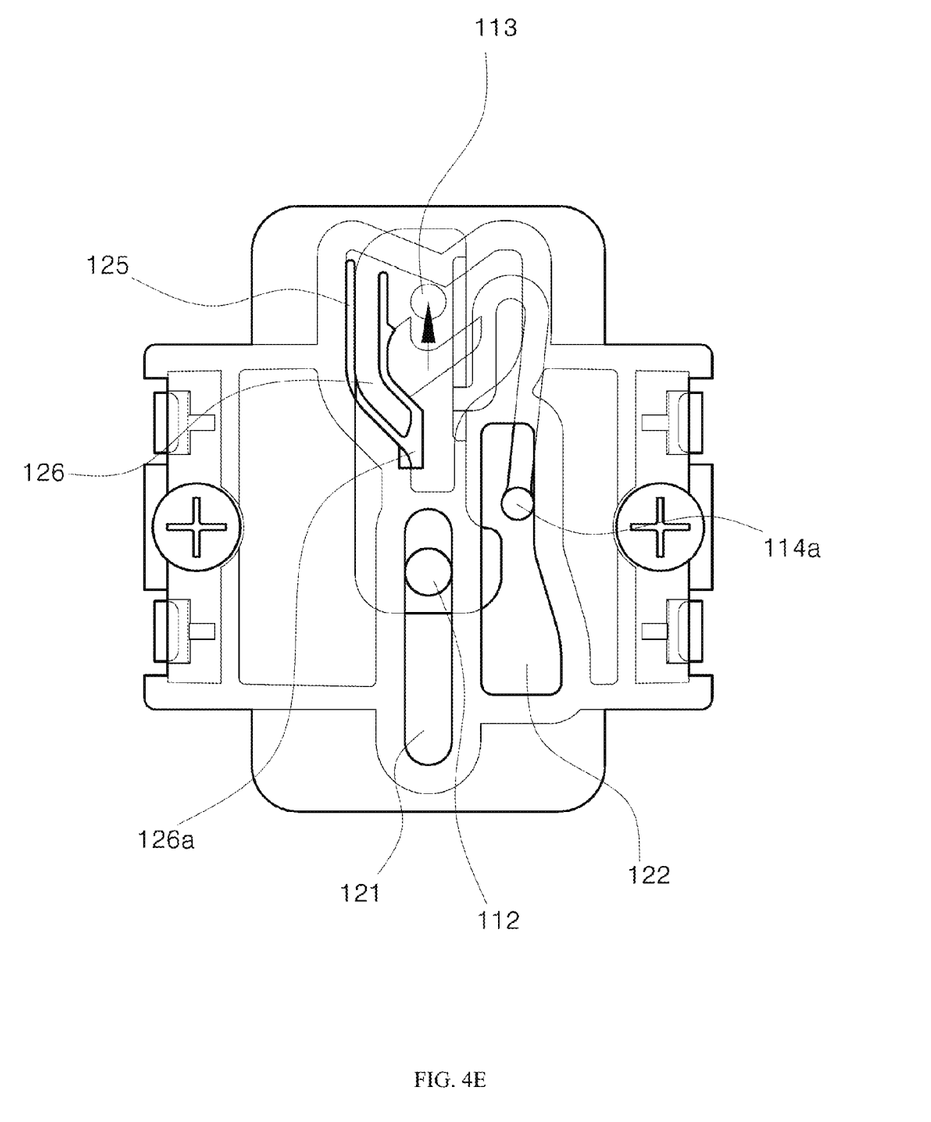
Figure 4F:
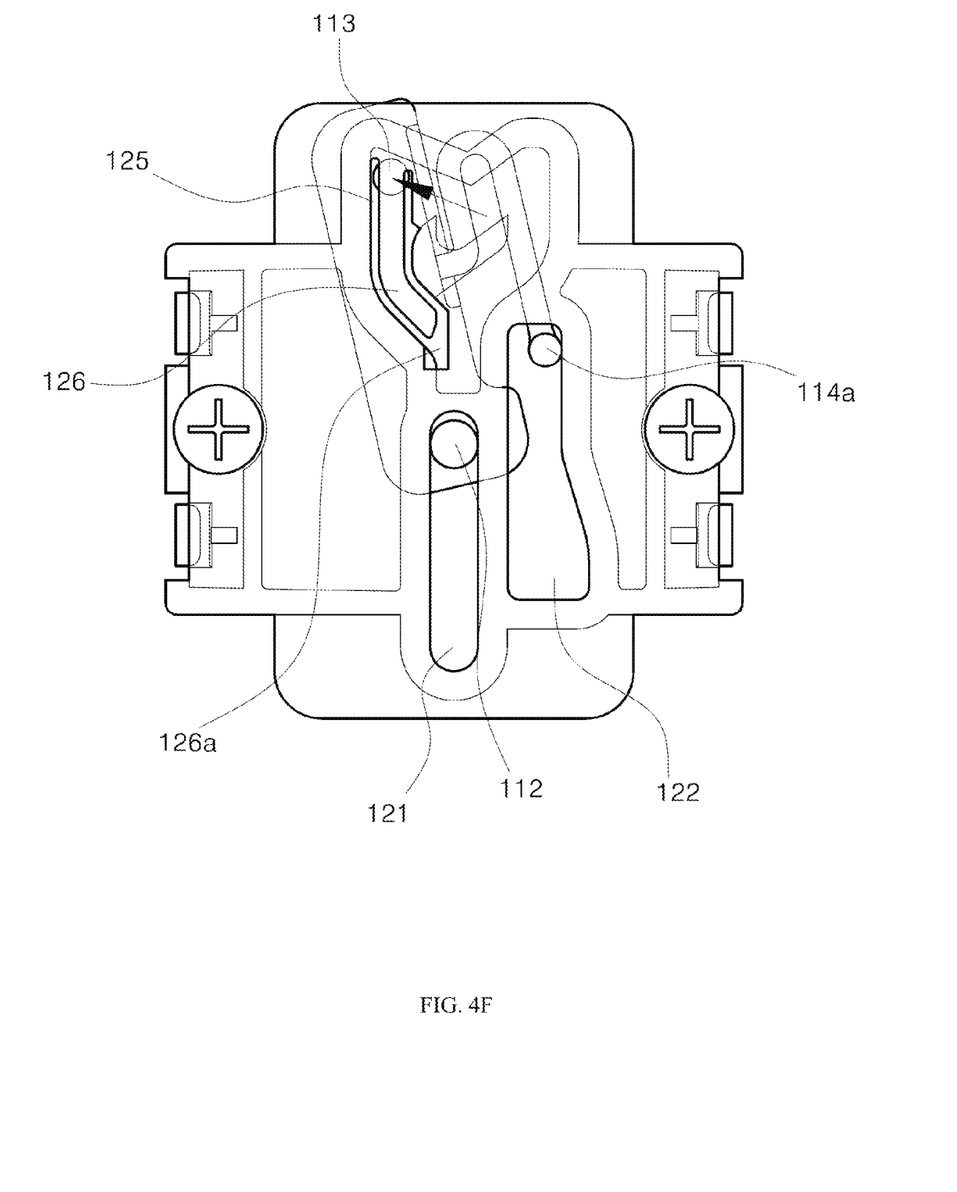
Figure 4G:
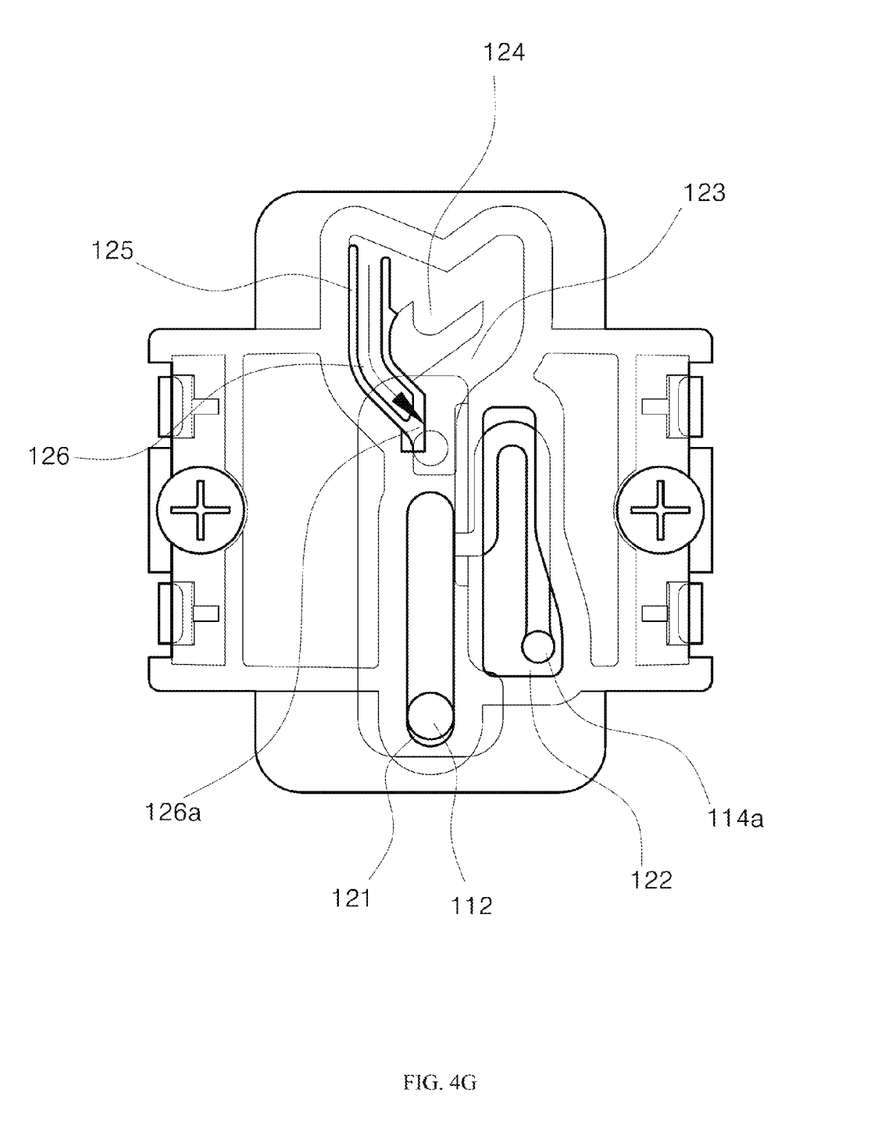
Figure 5:
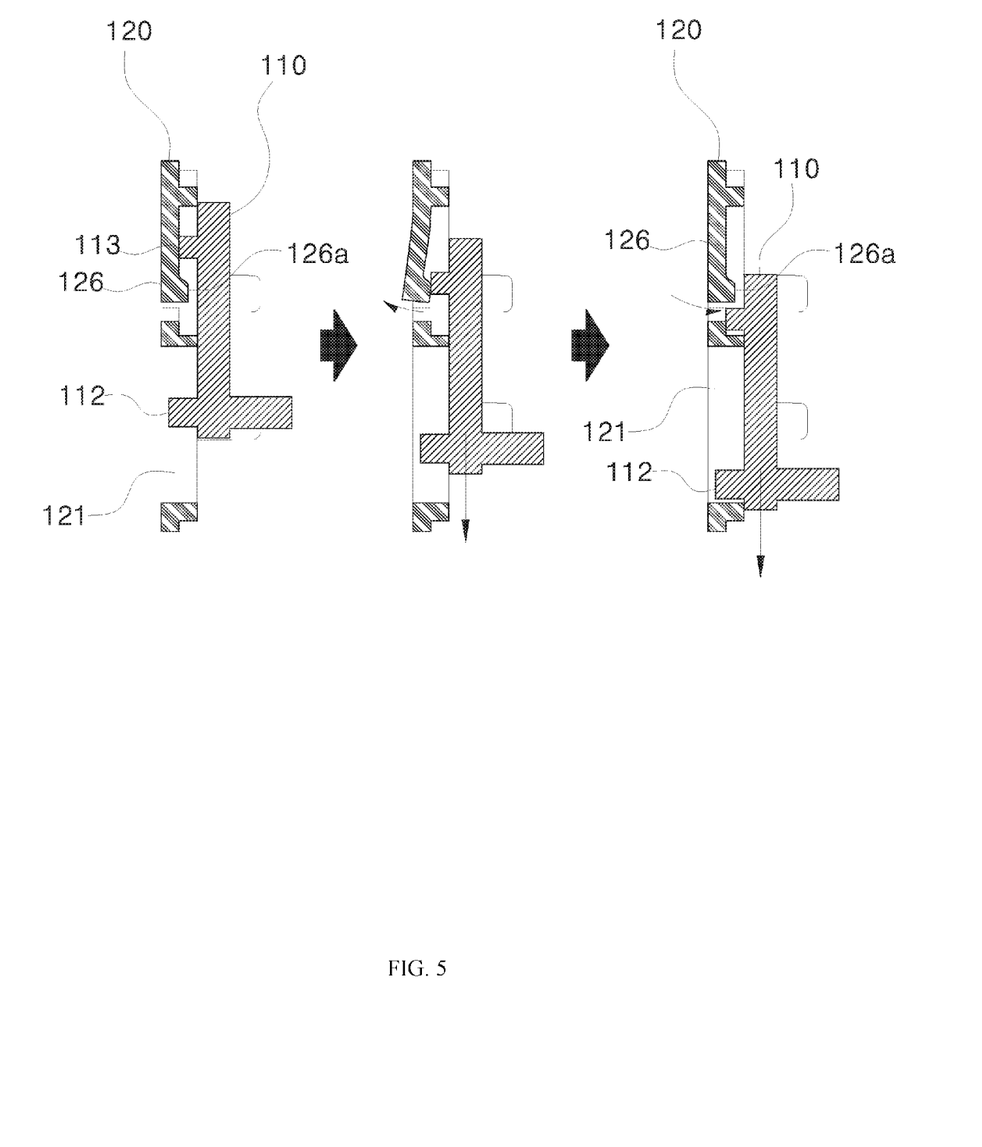
FIG. 5 is a view showing the collision between a guide protrusion of an elastic member and a contact surface of the lifting plate according to one embodiment of the present invention.

FIG. 1 is a perspective view showing one embodiment according to the present invention. FIG. 2 is a view showing the coupling state between an actuation guide unit and an actuation unit of FIG. 1 and a guide protrusion of an elastic member. FIG. 3 is a view showing a lifting plate coupled to a lifting body. FIGS. 4A to 4G are views showing the circulation of a lift protrusion of a lifting plate and an actuating state of the elastic member stepwise. FIG. 5 is a view showing the collision between a guide protrusion and a contact surface of the lifting plate due to elasticity as the guide protrusion is separated from the stop protrusion.

As shown in FIG. 1, the present invention relates to the structure of a locking-unlocking unit 100 to guide the locking of a lifting body 200 to be stopped in a lifting state after the lifting body 200 is primarily pushed and lifted by a filter cartridge 400 used on a water purification line, and to guide the unlocking of the lifting body 200 in a locking state so that the lifting member 200 falls from a fixing body 300 by secondarily pushing the filter cartridge 400 in the locking state According to one embodiment, as shown in FIG. 2, the locking-unlocking unit 100 may include an actuation unit 110 and an actuation guide unit 120. The actuation unit 110 may be movably mounted in the lifting body 200. Especially, the actuation unit 110 is moved left and right about a rotation shaft 116 provided at a lower portion thereof to excellently circulate along a lifting line 123 and a falling line 125 of the actuation unit 110. The actuation guide unit 120 engaged with the actuation unit 110 may be fixedly mounted in a fixing body 300.

Accordingly, the locking-unlocking unit 100 may control stopping (locking) the lifting body 200 in the lifting state, maintaining the lifting body 200 in a stopping state, and the dropping the lifting body 200 while releasing (unlocking) the stopping state of the lifting body 200 by pushing the lifting body 200 maintained in the stopping state again.

According to the present invention, the locking-unlocking unit 100 may be easily manufactured (including simplification in structure, and facilitation in assembling) and the operation of the locking-unlocking unit 100 may be exactly repeated. In addition, the locking-unlocking unit 100 has a simple structure, which may not cause failures.

To this end, according to one embodiment of the present invention, as shown in FIG. 2, for the coupling between the lifting body 200 and the actuation unit 110 and the left and right movement of the actuation unit 110 about the rotation shaft 116 in the coupling state, the lifting body 200 is formed therein with a rotation groove 220, and the actuation unit 110 includes the rotation shaft 116 rotatably inserted into the rotation groove 220 and preventing the lifting body 200 and the actuation unit 110 from being separated from each other.

Therefore, as the rotation shaft 116 is inserted into the rotation groove 220, the lifting body 200 and the actuation unit 110 are coupled to each other without arbitrary separation, and the actuation unit 110 may be lifted at the same time when the lifting body 200 is lifted, and may be moved left and right.

Regarding the structure of the actuation unit 110 in the state that the rotation shaft 116 is inserted into the rotation groove 220, the lifting plate 111 is provided on one surface (a front surface of the lifting plate 111 as shown in FIG. 2) thereof with a lifting guide protrusion 112, which protrudes from a lower end of the lifting plate 111 to be lifted and fall along a lift groove 121 provided in the actuation guide unit 120, and a stop protrusion 113 located right above the lifting guide protrusion 112 and located in a stop groove 124 to stop the lifting plate 111 when the lifting plate 111 is lifted.

Accordingly, when the lifting body 200 is primarily pushed and lifted in the state that the actuation unit 110 is coupled to the lifting body 200, the lifting plate 111 is simultaneously lifted while the stop protrusion 113 is lifted along a lifting line 123 of the actuation guide unit 120 and inserted into the stop groove 124 and stopped. Then, as the filter cartridge 400, which is stopped, is repeatedly pushed, the stop protrusion 113 is separated from the stop groove 124 and moved from the stop groove 124 to a falling line 125.

In this case, the lifting plate 111 is provided at one side thereof with an elastic rod 114 to guide the stop protrusion 113 so that the stop protrusion 113 is moved to the falling line 125. Accordingly, as the stop protrusion 113 is separated from the stop groove 124, the lifting plate 111 is moved to the falling line 125 while being prevented from being moved to the lifting line 123, so that the stopping state is released and the falling is started.

According to the present invention, the elastic rod 114, which is located at one side of the lifting plate 111, has a shape which is curved a at an upper portion thereof and extends downward b. Accordingly, when the elastic rod 114 is lifted along the lifting line, the elastic rod 114 may maintain elasticity. In addition, the elastic rod 114 is provided at a front end thereof with a tip protrusion 114a moved along an elastic rod guide groove 122 to be pressed when lifted and to be prevented from falling along the lifting line when falling.

In addition, the actuation guide unit 120, which has the elastic rod guide groove 122 to guide the lifting of the elastic rod 114 at the same time when the lifting plate 111 of the actuation unit 110 is lifted, and is provided in a plate shape, is mounted in the fixing body 300 and thus maintained in a fixing state.

The actuation guide unit 120 includes the lift groove 121, which allows the lifting guide protrusion 112 of the lifting plate 111 to be vertically lifted, the elastic rod guide groove 122, which is provided at one side of the lift groove 121 to allow the elastic rod 114 to be pressed while being lifted together with the lifting plate 111, the lifting line 123, which is provided at right above the lift groove 121 to lift the stop protrusion 113 of the lifting plate 111 only in one preset direction when the stop protrusion 113 of the lifting plate 111 is lifted as the lifting body 200 is lifted, and the stop groove 124 allowing the stop protrusion 113 lifted along the lifting line 123 to be stopped in the lifting state, and to be maintained in the stopping state.

To allow the lifting body 200 to fall as the lifting plate 111, which is lifted and maintained in the stopping state, is released from the stopping state, the stop groove 124 is provided at one side thereof with the falling line 125 to return the stop protrusion 113 to the original position thereof as the lifting body 200 is repeatedly pushed, and the lifting plate 111 is lifted again, so that the stop protrusion 113 is separated from the stop groove 124.

According to the present invention, a guide protrusion 126a protrudes from the falling line 125 while being inclined downward toward the front end of the falling line 125 to block an entrance of the falling line 125 so that the stop protrusion 113 is lifted only along the lifting line 123.

In addition, three sides (left, right, and front sides) of the falling line 125 having the guide protrusion 126a positioned in a falling direction are cut out except for an upper side of the guide protrusion 126a, so that the falling may be smoothly achieved, and a larger guide protrusion 126a to block the entrance of the falling line 125 is formed, so that the entrance can be more perfectly blocked.

Therefore, as the guide protrusion 126a protrudes from the front end of the elastic member 126, the guide protrusion 126a blocks the falling line 125 so that the stop protrusion 113 is essentially lifted only along the lifting line 123 when the lifting is started while guiding the stop protrusion 113 only to the lifting line 123. In order to allow the stop protrusion 113 to fall without being blocked when falling along the falling line 125, the guide protrusion 126a gradually protrudes toward the front end of the elastic member 126, so that the stop protrusion 113 smoothly falls in close contact with the elastic member 126. In this case, when the stop protrusion 113 falls, the stop protrusion 113 falls while pressing the guide protrusion 126a due to the elasticity of a spring 210 because the spring 210 has been pressed when the lifting body 200 is in the lifting state. In this state, when the falling of the stop protrusion 113 has been finished so that the stop protrusion 113 is separated from the guide protrusion 126a, the protrusion height of the guide protrusion 126a from the elastic member 126 causes the guide protrusion 126a to collide with a contact surface 115 provided at the upper end of the lifting plate 111 having the stop protrusion 113 due to the elasticity of the elastic member 126, so that rhythmical sound is generated to notify a user of the completion of the falling.

Accordingly, when the lifting of the stop protrusion 113 provided on the lifting plate 111 is started, the falling line 125 is blocked by the guide protrusion 126a formed at the entrance of the falling line 125, so that the stop protrusion 113 is lifted only along the lifting line 123. Accordingly, the stop protrusion 113 circulates in sequence of the lifting line 123, the stop groove 124, and the falling line 125.

Further, in the falling, a signal is generated due to the elasticity of the elastic member 126 to express the completion of the falling and to notify the user of the separation of the stop protrusion 113. Accordingly, the filter cartridge 400 detached from the lifting body 200 may be separated at an exact time point.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A locking-unlocking structure for guiding forward lifting of a lifting body lifted by repeating a pushing action, the locking-unlocking structure comprising:

an actuation guide unit provided at a center thereof therein with a stop groove to guide stop of a lifting body in a lifting state, having a lifting line and a falling line branching downward from the stop groove, and fixedly coupled to a fixing body; and an actuation unit comprising a lifting plate having a stop protrusion, which is mounted in the stop groove of the actuation guide unit or circulates along the lifting line and the falling line, and coupled to the lifting body movably left and right, wherein a guide protrusion protrudes from the falling line of the actuation guide unit while being inclined downward along the falling line to block an entrance so that the stop protrusion of the lifting plate is prevented from entering the falling line when the lifting plate of the actuation unit is lifted, and wherein the guide protrusion is provided in an elastic member to be elastically actuated when the stop protrusion of the lifting plate falls along the falling line.

2. The locking-unlocking structure of claim 1, wherein only one side of the elastic member having the guide protrusion is left, and three lower sides of the elastic member are open such that the elastic member is elastically actuated when the stop protrusion of the lifting plate falls along the falling line.

3. The locking-unlocking structure of claim 1, wherein the guide protrusion protrudes while being gradually inclined upward such that the stop protrusion of the lifting plate easily falls.

4. The locking-unlocking structure of claim 2, wherein the guide protrusion protrudes while being gradually inclined upward such that the stop protrusion of the lifting plate easily falls.

5. The locking-unlocking structure of claim 3, wherein the stop protrusion is provided to allow a contact surface to be formed in the lifting plate to collide with the guide protrusion when the stop protrusion falls along the falling line, slides on the guide protrusion, and is separated from the guide protrusion.

6. The locking-unlocking structure of claim 3, wherein the lifting plate of the actuation unit is provided at one side thereof with an elastic rod to correctly circulate along the lifting line and the falling line and to elastically move in an elastic rod guide groove of the actuation guide unit.

\* \* \* \* \*